United States Patent [19]
Restel

[11] 3,800,639
[45] Apr. 2, 1974

[54] GLASS CUTTER

[76] Inventor: Michael F. Restel, 95 New York Ave., Bergenfield, N.J. 08109

[22] Filed: Dec. 29, 1972

[21] Appl. No.: 319,781

[52] U.S. Cl.............................. 83/9, 33/32 C, 83/12, 83/902
[51] Int. Cl......................... C03b 33/02, B26d 3/08
[58] Field of Search .................. 83/9, 12, 902, 698; 33/32 C, 32 R

[56] References Cited
UNITED STATES PATENTS
3,080,897  3/1963  Winter.............................. 83/902 X
3,198,044  8/1965  Clin .................................... 83/12 X Primary Examiner—Frank T. Yost
Attorney, Agent, or Firm—Reno A. Del Ben

[57] ABSTRACT

The combination of a conventional radial arm saw which has an anti-kickback rod holding member and a glass cutting attachment which is held in place by the anti-kickback rod holding member. By axially moving the radial arm of the saw, a piece of sheet glass positioned on the radial arm saw's bench may be scored as required preparatory to breaking the glass along the scored line.

6 Claims, 8 Drawing Figures

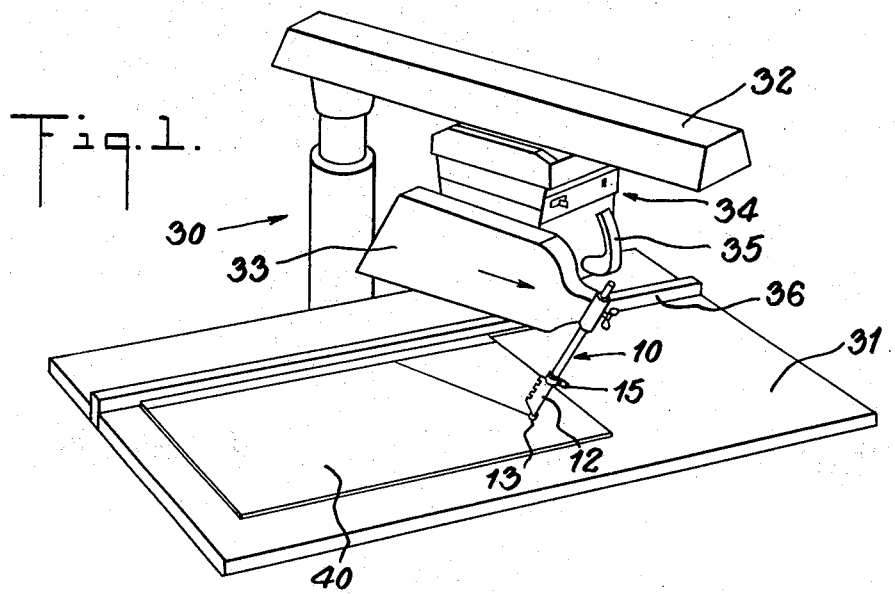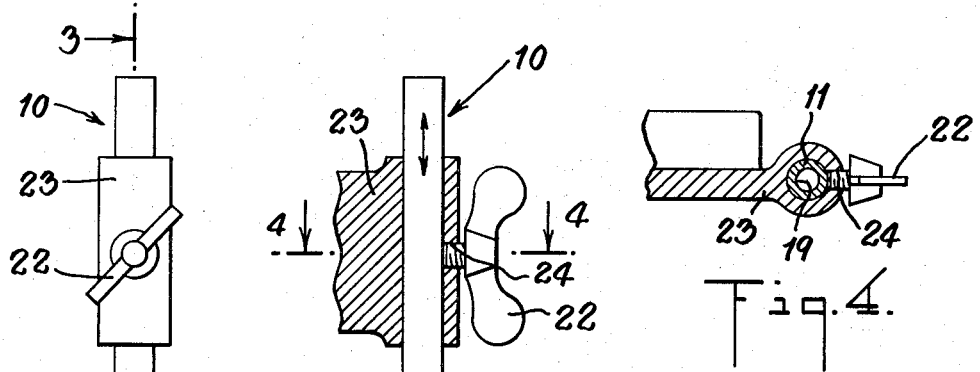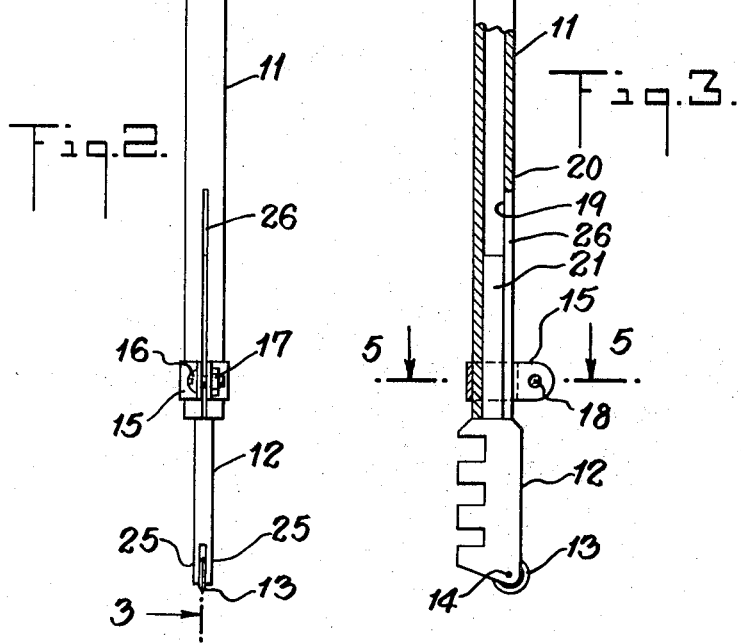

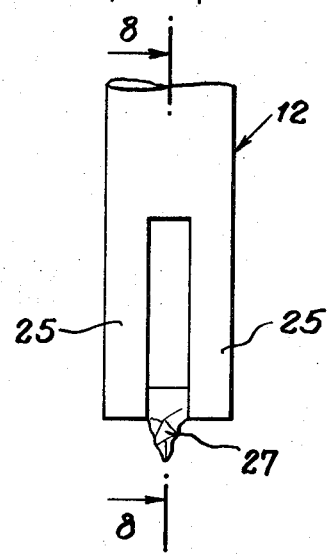
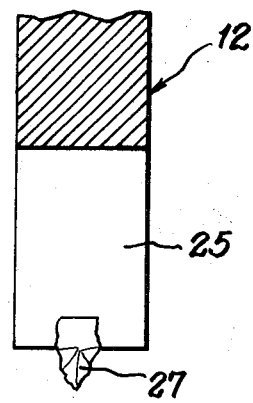
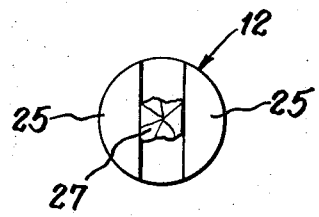

GLASS CUTTER

This invention relates to attachments for power saws, and more particularly to attachments for said saws to permit their use for the cutting of sheet glass.

The hand cutting of sheet glass requires a certain degree of skill and experience which the home craftsman does not generally have. In the hand cutting of sheet glass, the sheet of glass must be scored with a hand held glass cutter which must be pressed against the glass continuously and with a uniform degree of pressure and care must be taken to assure that the scoring is done in such a manner that there is no discontinuity in the score. After the scoring of the glass, the glass is bent along the score line to break the glass along that line. If the scoring of the glass is done with insufficient pressure or discontinuously, the glass will not break along the score line, but rather in an unpredictable and frequently dangerous manner, often resulting in the glass cutting the fingers of the person who is attempting to cut the glass.

It is an object of this invention to provide a glass cutting attachment for a radial arm saw which may be used to uniformly score and cut sheet glass.

It is a further object of this invention to provide a glass cutter which may be easily attached to a radial arm saw, using the radial arm saw's existing anti-kickback rod holding member to hold and support the glass cutting attachment.

It is still another object of this invention to provide a glass cutting attachment for a radial arm saw which may be readily adjusted so as to apply a uniformly sufficient pressure to a sheet of glass so as to score same properly in order that the glass may be easily broken along the score line.

It is still a further object of this invention to provide a glass cutter which may be easily attached to a radial arm saw and which may be easily used by one unskilled in the cutting of glass to cut sheet glass properly and which will minimize the danger of the glass breaking in a dangerous manner.

These and other objects of the invention will appear from time to time as the following specifications, indicating the preferred embodiment of the invention, proceed, and by reference to the accompanying drawings in which:

FIG. 1 is a perspective view of a typical radial arm saw with the glass cutting attachment shown attached to the saw and held in place by the anti-kickback rod holding member and making an angular cut or score on a piece of sheet glass;

FIG. 2 is an elevational view of the glass cutter assembly of this invention shown inserted within the bore of an anti-kickback rod holding member of a typical radial arm saw;

FIG. 3 is a vertical sectional view taken on the plane and in the direction of 3—3 of FIG. 2;

FIG. 4 is a horizontal sectional view taken on the plane and in the direction of 4—4 of FIG. 3;

FIG. 5 is a horizontal sectional view taken on the plane and in the direction of 5—5 of FIG. 3;

FIG. 6 is an elevational view of the lower portion of the glass cutter assembly of FIG. 2 in an alternate embodiment.

FIG. 7 is a bottom end view of the glass cutter assembly in the alternate embodiment of FIG. 6.

FIG. 8 is a vertical sectional view of a portion of the glass cutter assembly in its alternate embodiment of FIG. 6, taken on the plane 8—8 of FIG. 6.

Referring to the drawings in which the same or similar parts have been given the same numerals in the several drawings:

The invention, designated generally by the numeral 10, which is shown mounted in the anti-kickback rod holding member, 23, of a typical radial arm saw 30, in FIG. 1, comprises a tubular arm 11, which is adapted for clutching engagement by the anti-kickback rod holding member 23, of a typical radial arm saw, which tubular arm 11 has a slit 26 at one end of the rod, the slit 26 being parallel to the axis of the arm 11. A clamp 15 is attached to the arm 11 near the end having the slit 26 and is positioned over the slit 26. The clamp has apertures 18 through which a machine screw 16 may be passed, and by means of which machine screw 16, and its mating nut 17, the clamp may be tightened. A cutting wheel holding member 12 is provided which has a tubular portion 21 which fits loosely inside the tubular arm 11 when the clamp 15 is in its untightened position. By tightening the clamp 15, the inner surfaces 19 of the tubular arm 11 are moved together in the vicinity of the clamp, and the tubular portion 21 of the cutting wheel holding member 12, may be firmly attached to the tubular arm 11. Two fingers 25 are located on the cutting wheel holding member 12 opposite the tubular portion of the cutting wheel holding member 21 and have a pin 14 passing between them. A cutting wheel 13, fashioned of hardened steel, is rotatably mounted on said pin 14, which cutting wheel is adapted for scoring and cutting glass. Alternatively, a pointed diamond 27 may be placed between the two fingers 25, and held in place by fashioning the fingers around the diamond, in which case the pin 14 may be eliminated.

In use, the invention 10 is mounted in the anti-kickback rod holding member 23 of a typical radial arm saw 30. The radial arm saw may either have a blade connected to its arbor or it may have the blade removed. A sheet of glass 40 is placed on the bench 31 of the radial arm saw 30 against the alignment bar 36. The sliding arm 32 of the saw is positioned at the desired angle. The invention 10 is then placed so that the cutting wheel 13 rests against the sheet of glass with a firm pressure, which pressure should be sufficient to score the glass deeply, the positioning of the cutting wheel 13 being such that the cutting wheel 13 is parallel to the axis of the radial arm saw's sliding arm 32. The invention 10 is then clamped in position by tightening the winged set screw 22 which is threaded into the threaded bore 24 of the anti-kickback rod holding member and the cutting wheel 13 is then drawn across the entire length of the glass 40 by means of the radial arm saw's handle 35. Thereafter, the scoring of similarly sized pieces of glass may be easily repeated without changing the position of the invention in the anti-kickback rod holding member.

The scoring will be of a uniform depth, and if sufficient pressure has been provided in originally setting the cutting wheel 13 against the glass 40, the glass will break easily along the scored line.

The arm 11 of the invention may easily be made of different lengths and corss-sections to accomodate different brands of radial arm saws, the use of a tubular arm being for illustrative purposes only.

While a number of different embodiments of the invention have herein been shown and described, it may readily be understood that various modifications and variations in the invention may be attained without departing from the spirit and scope of the novel concepts thereof, as defined by the claims appended hereto.

I claim:

1. In combination, a machine having a movable arm supporting a rotary cutter, a shaft-like support member on said machine and having a free end positioned adjacent to an edge of said rotary cutter, a threaded bore extending through one side of said support member perpendicular to the axis of the support member, a threaded member threadedly engaging said threaded bore, and a glass cutter assembly supported in said support member and held from axial motion by said threaded member, said glass cutter assembly comprising: an arm, which arm is engaged in and supported by said support member, a cutter holding member attached to said arm, and glass cutting means mounted on said cutter holding member, the glass cutter assembly being adapted to score a piece of sheet glass when the movable arm is axially extended.

2. The combination, as claimed in claim 1, wherein the glass cutting means comprises a cutting wheel rotatably mounted on said cutter holding member in alignment with the movable arm.

3. In combination, a radial arm saw having an anti-kickback rod holding member, and a glass cutter assembly rigidly supported in said anti-kickback rod holding member, said glass cutter assembly comprising an arm, which arm is engaged in and supported by said anti-kickback rod holding member, a cutter holding member attached to said arm, and glass scoring means mounted on said cutter holding member, the glass cutter assembly being adapted to score a piece of sheet glass positioned on the bench of the radial arm saw when the movable radial arm of the radial arm saw is axially extended.

4. The combination as claimed in claim 3, wherein the glass cutting means comprises a cutting wheel rotatably mounted on said cutter holding member in alignment with the movable arm.

5. The combination as claimed in claim 3, wherein the cutter holding member is provided with a plurality of fingers and the glass cutting means comprises a pointed diamond which is held in place on the cutter holding member by the fingers.

6. The combination as claimed in claim 3, wherein the arm is hollow and has a round inner surface and has a slit passing through the wall of the arm between the inner and outer surfaces of the arm, which slit is parallel to the axis of the arm, and a clamp is provided which is mounted on the arm over the slit, and the cutter holding member has a cylindrical portion which is located opposite the glass cutting means, which cylindrical portion fits inside the inner surface of the arm in the vicinity of the slit, and which cylindrical portion is held in place by the action of the clamp on the outer surface of the arm.

* * * * *